United States Patent
Peake

(10) Patent No.: US 9,469,410 B2
(45) Date of Patent: Oct. 18, 2016

(54) AERIAL REFUELING SYSTEM, APPARATUS AND METHODS

(75) Inventor: Steven C. Peake, Dubuque, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 34 days.

(21) Appl. No.: 13/188,716

(22) Filed: Jul. 22, 2011

(65) Prior Publication Data

US 2013/0020441 A1 Jan. 24, 2013

(51) Int. Cl.
| | | |
|---|---|---|
| *B64D 39/00* | (2006.01) | |
| *B64D 39/02* | (2006.01) | |
| *B64D 39/06* | (2006.01) | |

(52) U.S. Cl.
CPC ............. *B64D 39/02* (2013.01); *B64D 39/06* (2013.01)

(58) Field of Classification Search
CPC ...... B64D 39/00; B64D 39/06; B64D 37/00; B64D 45/00; B64D 47/06; B64D 39/02; B64D 47/00; B64D 7/00; B64D 2211/00; B64D 37/04; B64D 37/10; B64D 37/14; B64D 47/02; B64D 5/00; B64C 39/022; B64C 13/00; B64C 2201/063; B64C 2201/082
USPC ........................................... 244/135 A, 1 TD
See application file for complete search history.

(56) References Cited

U.S. PATENT DOCUMENTS

| | | | |
|---|---|---|---|
| 5,906,336 A * | 5/1999 | Eckstein ................ 244/135 A |
| 6,454,212 B1 | 9/2002 | Bartov | |
| 6,786,455 B1 | 9/2004 | Bartov | |
| 6,935,595 B2 * | 8/2005 | Butsch et al. ............ 244/135 A |
| 6,960,750 B2 * | 11/2005 | Doane ....................... 250/206.1 |
| 7,152,828 B1 * | 12/2006 | Garcia et al. ............ 244/135 A |
| 2003/0136874 A1 * | 7/2003 | Gjerdrum .................... 244/10 |
| 2006/0060709 A1 * | 3/2006 | Thal ......................... 244/135 A |
| 2006/0202088 A1 * | 9/2006 | Padan ....................... 244/137.1 |
| 2008/0054124 A1 * | 3/2008 | Takacs et al. ............ 244/135 A |
| 2008/0075467 A1 * | 3/2008 | Mickley .................... G01S 1/70 398/131 |
| 2010/0163679 A1 * | 7/2010 | Mickley et al. .......... 244/135 A |
| 2010/0237196 A1 * | 9/2010 | Saggio et al. ............ 244/135 A |
| 2012/0153084 A1 * | 6/2012 | Etzkorn et al. .......... 244/135 A |
| 2012/0168564 A1 * | 7/2012 | Feldmann et al. ........ 244/135 A |

* cited by examiner

*Primary Examiner* — Brian M O'Hara
*Assistant Examiner* — George Andonyan
(74) *Attorney, Agent, or Firm* — Woods Oviatt Gilman LLP; Katherine H. McGuire, Esq.

(57) ABSTRACT

An aerial refueling system utilizes the full drogue-probe coupling event as a control parameter for hose control. A variety of different types of signal sending and signal receiving devices may be used to indicate a coupling event between the drogue and probe. A positive coupling signal may serve to trigger a hose reel actuator to take up slack in the hose 16.

15 Claims, 13 Drawing Sheets

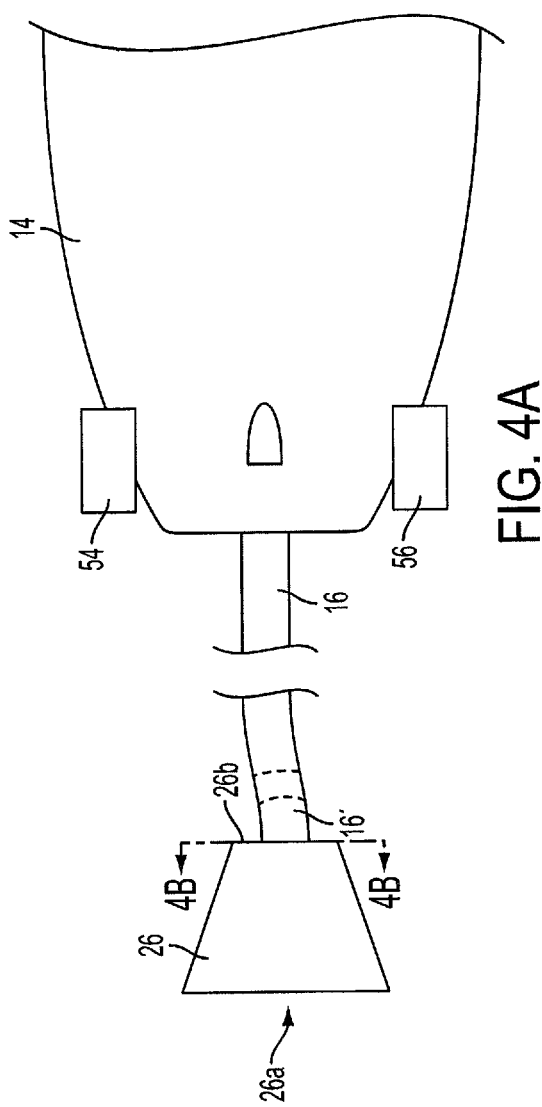
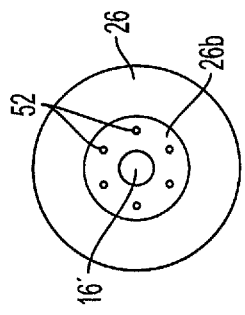
FIG. 4A
FIG. 4B

SIGNAL FROM SENSOR/TRIGGER

COUPLED PULSE    UNCOUPLED PULSE

PREFERRED EMBODIMENT HYDRAULIC FORCE

SENSOR INDICATING FORCE ON HOSE REEL

ELEVATED FORCE AT COUPLING

NORMAL FORCE AT TRAIL t

COUPLING SENSE SIGNAL

↑ FORCE

OPTIMIZED REEL MOTOR RESPONSE - CAN BE SPECIFIC TO THE DROGUE OR TRAILING AIRCRAFT BEING REFUELED

AERIAL REFUELING SYSTEM, APPARATUS AND METHODS

BACKGROUND OF THE INVENTION

The present invention relates to aerial refueling, and more particularly relates to improved system, apparatus and methods for controlling the slack in the refueling hose during the refueling operation.

The process of aerial refueling is well known and allows a plane or other aircraft to be refueled in flight without the need to land. This is typically used by the military for long distance flights where landing of the air craft would be impossible, unsafe or otherwise undesirable. The refueling process consists of a leading aircraft which refuels a trailing aircraft via a rigid boom or flexible hose that typically includes a funnel-shaped device (referred to as a "drogue") at the free end thereof which releasably engages with a probe leading to the fuel tank of the trailing aircraft. With the leading aircraft travelling at a constant speed and the hose/drogue freely extending therebehind, the trailing aircraft probe is aligned with the drogue and its speed is increased in an attempt to couple the probe and drogue. This maneuver is typically called "making a run at the drogue". Sometimes the alignment is off and the coupling fails whereupon the sequence is repeated until a successful coupling has occurred. When the drogue and probe are coupled, fuel may be delivered from an auxiliary fuel tank on the leading aircraft through the boom or hose to the probe of the trailing aircraft which leads to the trailing aircraft fuel tank(s), thereby refueling the trailing aircraft during flight.

One potential problem that occurs in such a refueling system is controlling the slack and oscillations in the flexible hose. If there is too much slack in the hose when the drogue and probe are in the coupling process or after they are coupled, this can cause the hose to oscillate and fail to couple or unintentionally detach from the probe.

The following patents illustrate various attempts to control the above hose slack problem in aerial refueling systems:

U.S. Pat. No. 6,454,212 issued to Bartov on Sep. 24, 2002
U.S. Pat. No. 6,786,455 issued to Bartov on Sep. 7, 2004
U.S. Pat. No. 6,866,228 issued to Bartov on Mar. 15, 2005

The '212 patent utilizes a reaction torque sensor and microprocessor which connects to the control valve of a variable displacement hydraulic motor which controls the deployment and retraction of the hose reel. The microprocessor receives data relating to the reaction torque on the hose reel (i.e., as a result of contact of the receiving aircraft's refueling probe with the drogue and/or air stream effects) from the reaction torque sensor 36 which is preferably a load cell electrically connected to the microprocessor. The microprocessor also receives data on the position (speed and direction) of the hose from a tachometer/position sensor 34 which is preferably connected to the drive shaft of the hose reel to measure how much length and how fast the hose is deploying from the reel. The microprocessor then sends signals to the hydraulic motor control valve in response to the signals it receives from the command instructions initiated by the tanker aircraft's pilot or by avionic equipment (e.g., deploy or retract hose), as well as the tachometer/position sensor and torque sensor. Thus, the hose is controlled in this instance by sensing the position and speed of the hose as it leaves the reel, and the torque on the reel as caused by forces acting on the drogue by the probe and/or air currents. The free drag torque is compared to the net drag torque and signals are generated and sent to the control valve according to the microprocessor algorithm. As explained at Column 6, lines 50-65 of the '212 patent, if the net drag torque drops too far below the free drag torque, dangerous slack may develop in the hose. The algorithm thus calculates the net drag force and reacts to a predetermined threshold reading by sending a signal to retract the hose.

The '228 patent, which is a continuation-in-part of the '212 patent, discloses the further step of retracting the hose prior to hook-up with the probe to record the free hose retraction force which is then compared to the retraction force following engagement with retraction continuing until the retraction force rises to about the same force as previously recorded.

The '455 patent discloses drogue and probe positors (position sensors, transmitters and/or receivers) which are capable of determining the relative positions of the drogue and probe. Once the probe and drogue are in orthogonal alignment, the hose is extended further to reach and engage the probe (this is opposed to the trailing aircraft making a run at the drogue which the inventor states can cause slack in the hose). Air jets (thrusters) about the drogue may also be used to assist in the alignment of the probe and drogue.

Although the above patents illustrate various methods and systems by which a refueling hose may be monitored and controlled during the refueling operation, there still remains a need for a more precise system and method of controlling slack in the refueling hose by utilizing the coupling event between the probe and drogue as a system control parameter.

SUMMARY OF THE INVENTION

The present invention addresses the above need by providing, in one embodiment of the invention, an in-flight refueling system between a leading aircraft and a trailing aircraft through a hose having a first end attached to said leading aircraft and a second, free end connected to a drogue, the trailing aircraft having a probe in fluid communication with the trailing aircraft fuel tank, the probe adapted to releasably couple with said drogue while the leading and trailing aircraft are both in flight, said system comprising:

a) an actuator on said leading aircraft to which said hose first end is connected, said actuator operable to control the extension and retraction of said hose with respect to said leading aircraft;
b) one or more signal emitting devices on said drogue;
c) one or more signal receiving devices connected to said leading aircraft and operable to control said actuator; and
d) one or more trigger devices positioned to be triggered upon coupling of said probe with said drogue, said one or more trigger devices when triggered operable to cause said one or more signal emitting devices to emit a signal which is received by said one or more signal receiving devices on said leading aircraft which thereupon causes said actuator to take up slack in said hose while said drogue and said probe are coupled with one another.

The actuator may be an electric motor or hydraulic motor, for example, connected to the hose reel. The signal emitted by the drogue/probe coupling event may be designed as a predetermined function that varies according to the desired motor response or as a discrete on-off function.

The trigger device may be anything that is capable of responding to a drogue/probe coupling event which occurs when the probe has fully coupled with the drogue which, in turn, initiates fuel delivery through the hose to the probe and fuel tank of the trailing aircraft. In one preferred embodiment, the trigger device is a mechanical switch that is located within the funnel of the drogue in a normally open position. In a typical prior art drogue, one or more biased rollers are present in the drogue over which the outer surface of the probe passes as it enters the drogue. As the probe passes over the rollers, the rollers deflect a small amount in a radially outward direction. The switch may be attached to one or more of these rollers such that the switch closes when the respective roller deflects under pressure from the probe.

In another preferred embodiment, the trigger device is a sensor which is activated by the probe when the probe has coupled with the drogue. For example, the sensor may be a light source (e.g., LED) and a light detector positioned opposite each other in the drogue funnel beyond the location of the rollers in a direction toward the hose. With the light source normally on, the detector is receiving the signal from the light source. When the light path is broken by the probe passing therethrough (indicating a coupling event), the detector responds by sending a signal to the actuator on the leading aircraft hose reel which, in turn, responds by taking up slack in the hose.

Yet another embodiment of trigger device may be any type of proximity sensor that is positioned to activate upon sensing the probe has entered the drogue a distance sufficient to indicate a coupling event.

As will be described more fully below, the trigger devices described herein may work in the reverse to signal a decoupling event which occurs when the probe detaches from the drogue. This may be intentional, as when the fueling operation is completed, or unintentional due to such things as mechanical failure, unintentional pull away of the leading and trailing aircraft, and excessive wind forces, for example. Appropriate system responses (e.g., reel rewind of the hose) may then be designed into the system.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein:

FIG. 4A is a simplified schematic representation of an embodiment of the invention showing the refueling pod with hose and drogue;

FIG. 4B is a rear elevational view of an embodiment of the drogue;

DETAILED DESCRIPTION OF PREFERRED EMBODIMENTS

Figure 1:
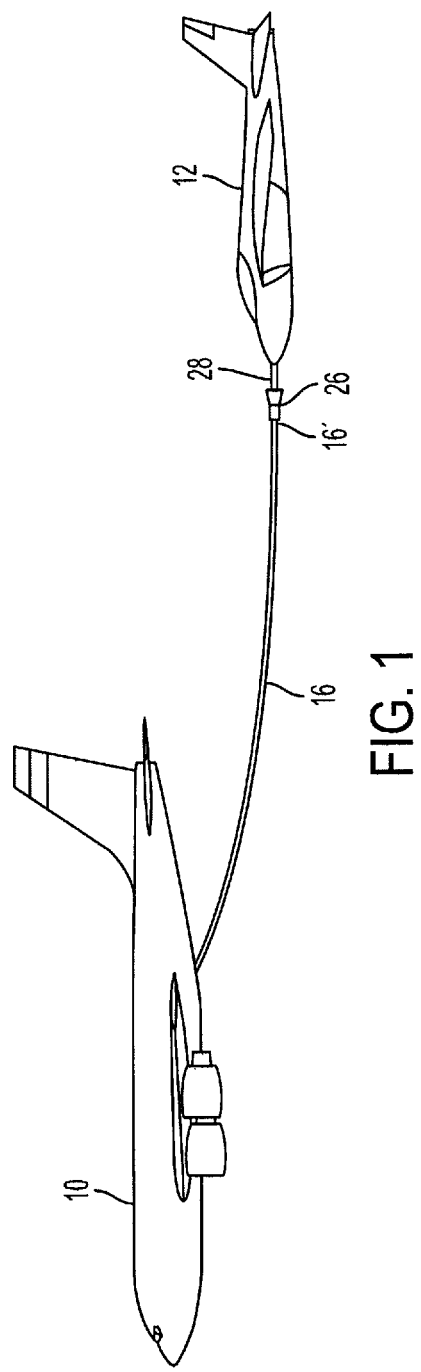
FIG. 1 is a simplified side elevational view of a leading aircraft refueling a trailing aircraft.
Figure 2:
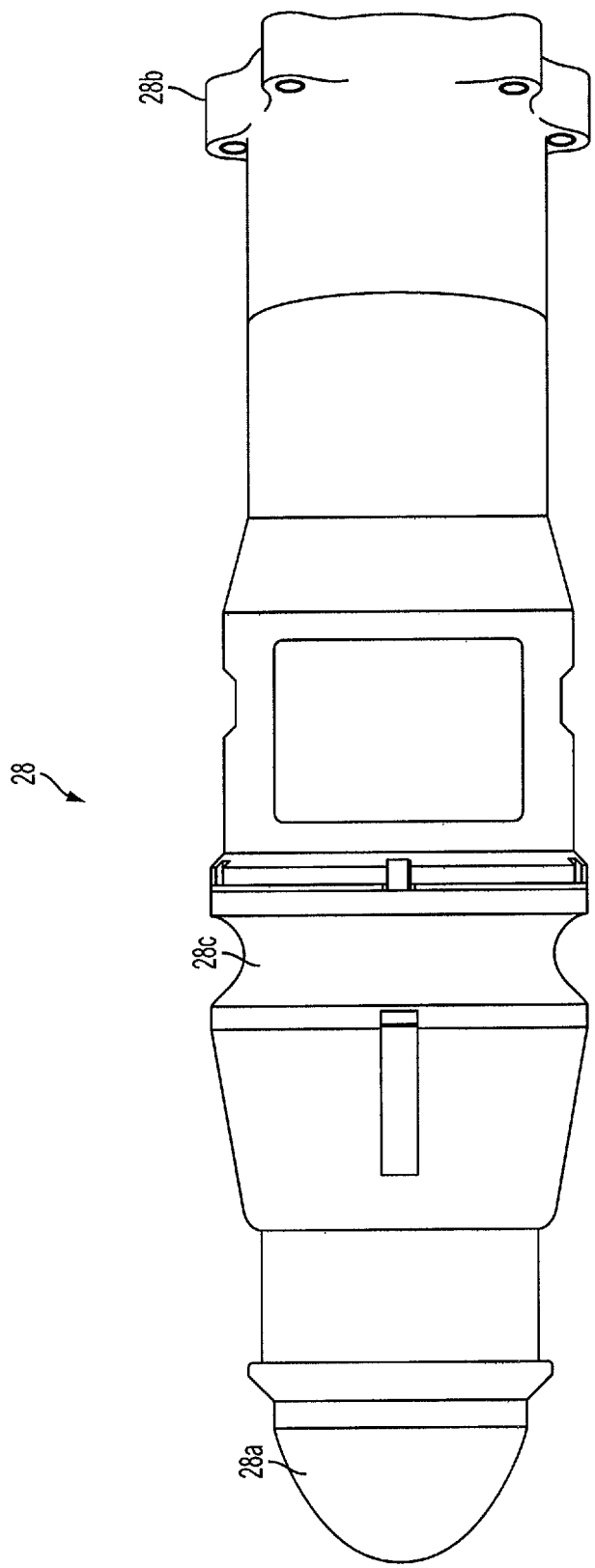
FIG. 2 is a side elevational view of an embodiment of the probe of the present invention.
Figure 3A:
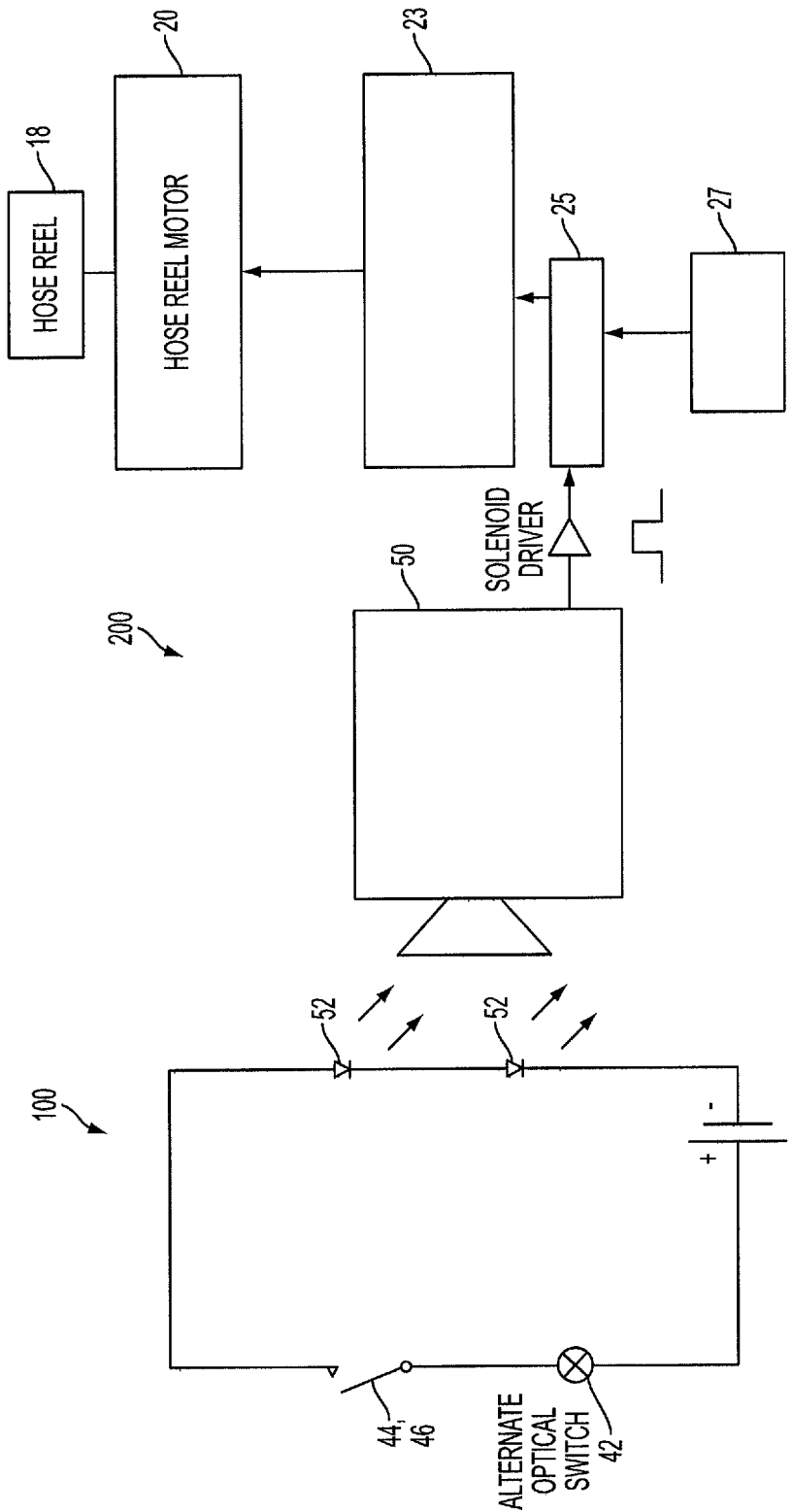
FIG. 3A is a simplified schematic representation of an embodiment of the present invention.
Figure 3B:
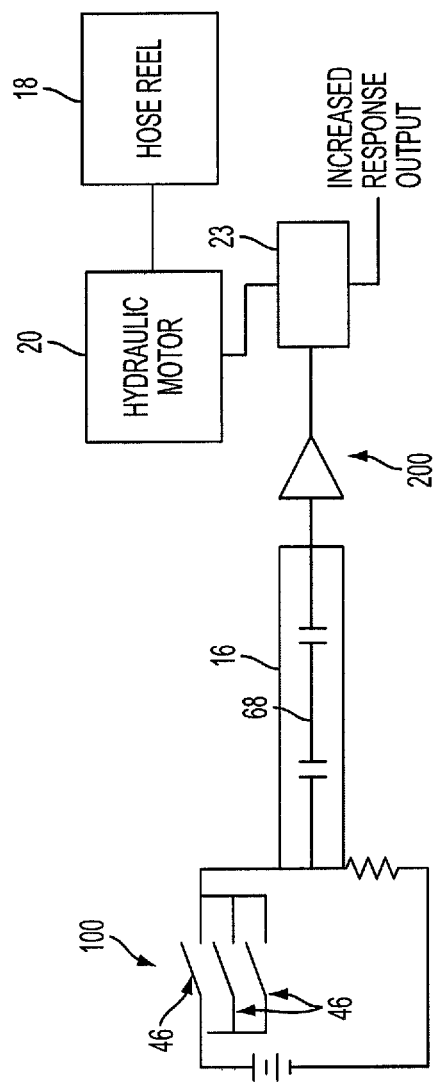
FIG. 3B is a simplified schematic representation of another embodiment of the present invention.
Figure 3C:
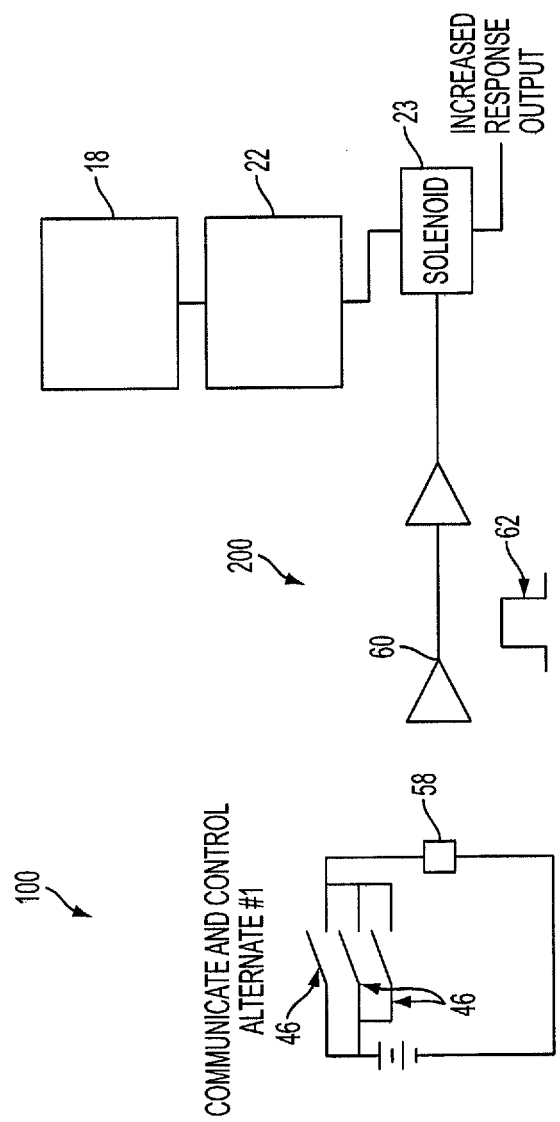
FIG. 3C is a simplified schematic representation of yet another embodiment of the present invention.
Figure 3D:
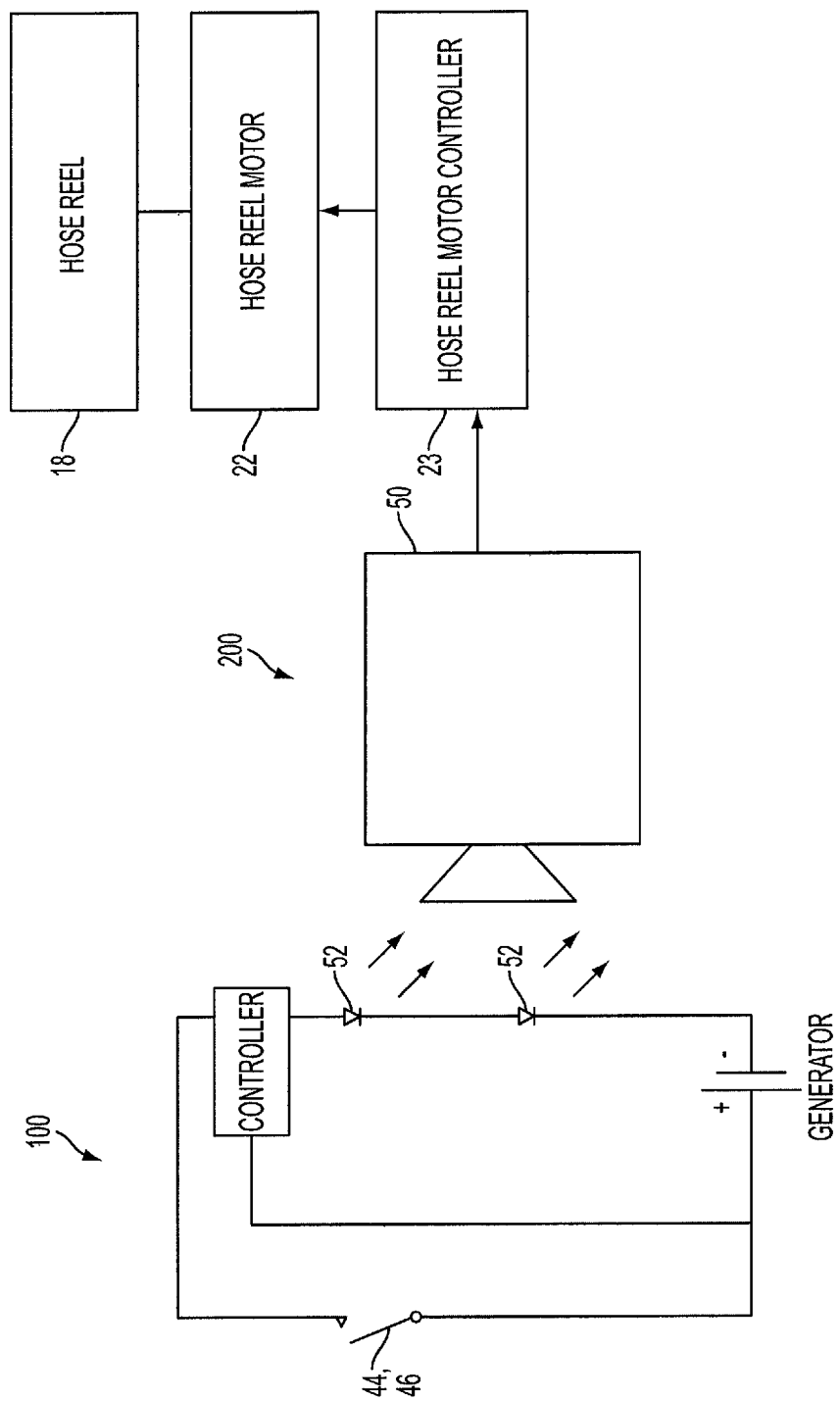
FIG. 3D is a simplified schematic representation of still another embodiment of the present invention.

Referring now to the drawing, there is seen in FIG. 1 a simplified elevational view of a first plane, or leading aircraft 10, and a second plane, or trailing aircraft 12, which is to receive fuel from the leading aircraft 10. The leading aircraft 10 includes a fuel tank which may be in the form of an auxiliary fuel pod 14 (see also FIG. 4A). A fuel hose 16 connects to the fuel pod 14 and is carried on a hose reel 18 (depicted schematically in FIGS. 3A-D) which rotates in either direction to alternately retract and wind the hose on the reel, or unwind and feed the hose from the reel. Any type of appropriate actuator may be used to connect to and control the rotational movement of the hose reel 18 and thus also the feed and retraction intervals and rates of the hose. For example, a hydraulic motor, such as a hydraulic hose reel motor 20 as seen in FIGS. 3A-C, or an electric motor 22 as seen in FIG. 3D may be used as the hose reel actuator as will be explained more fully below.

Figure 5A:
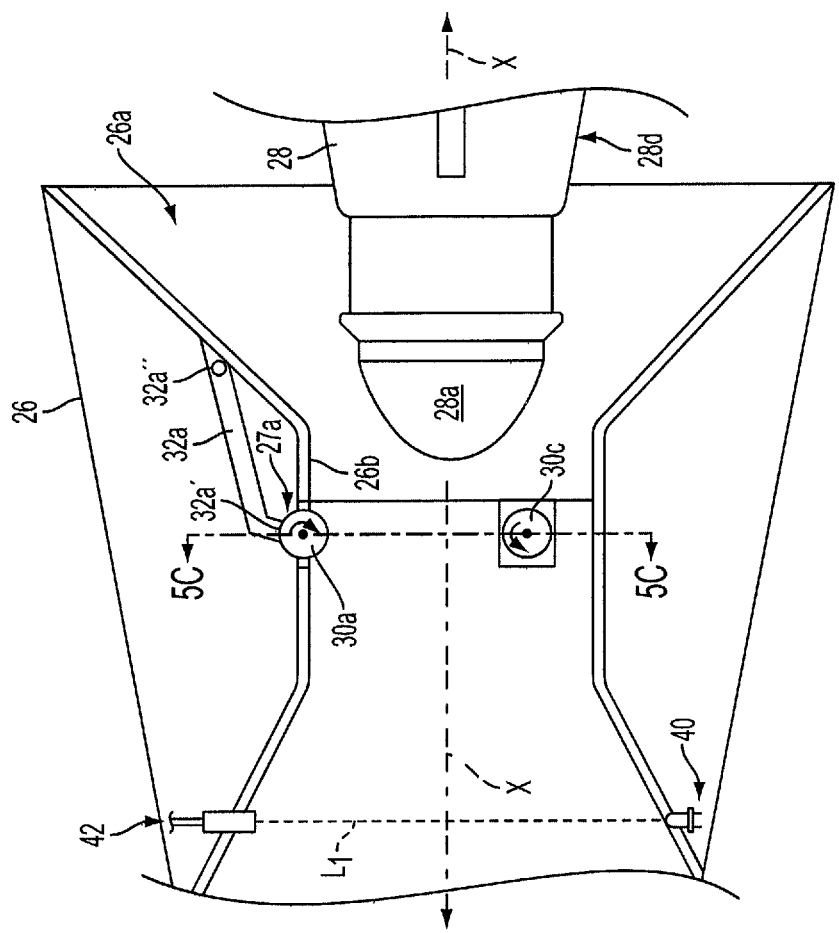
FIG. 5A is a fragmented side elevational view of the drogue and probe immediately prior to engagement with one another.
Figure 5B:
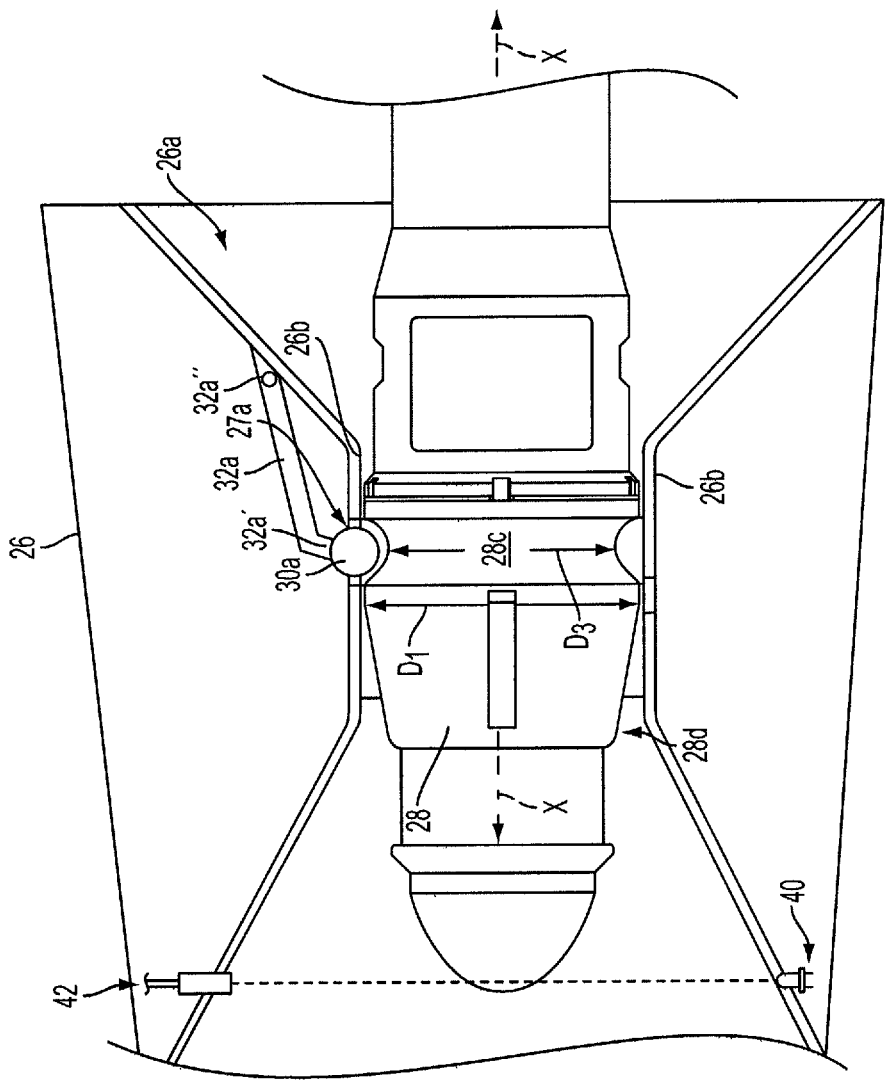
FIG. 5B is a fragmented side elevational view of the drogue and probe in full engagement with one another.

Hose 16 includes a free end 16' located opposite the end which connects to the hose reel 18. A drogue 26 is attached to hose free end 16' and is funnel-shaped to provide a wide opening for the probe 28 of the trailing aircraft 12. As described above, probe 28 connects to a hose fuel line that is in fluid communication with the fuel tank (not shown) of the trailing aircraft 12. Probe 28 is configured to releasably couple with drogue 26. More particularly, drogue 26 includes a narrowed neck portion 26b which includes one or more roller elements 30, and preferably three roller elements 30a-c positioned in substantially equally annularly spaced relation about neck portion 26b (see FIG. 5C). Probe 28 is elongated having a free distal end 28a and opposite proximal end 28b which attaches to the hose leading to the trailing aircraft fuel tank. Probe 28 further includes a narrowed ring segment 28c which is configured to engage with rollers 30a-c. FIG. 5A shows probe 28 entering drogue opening 26a and FIGS. 5B and 6 show full coupling of the probe 28 to the drogue 26 with the drogue rollers (only roller 30a seen) located within narrowed ring segment 28c.

Figure 5C:
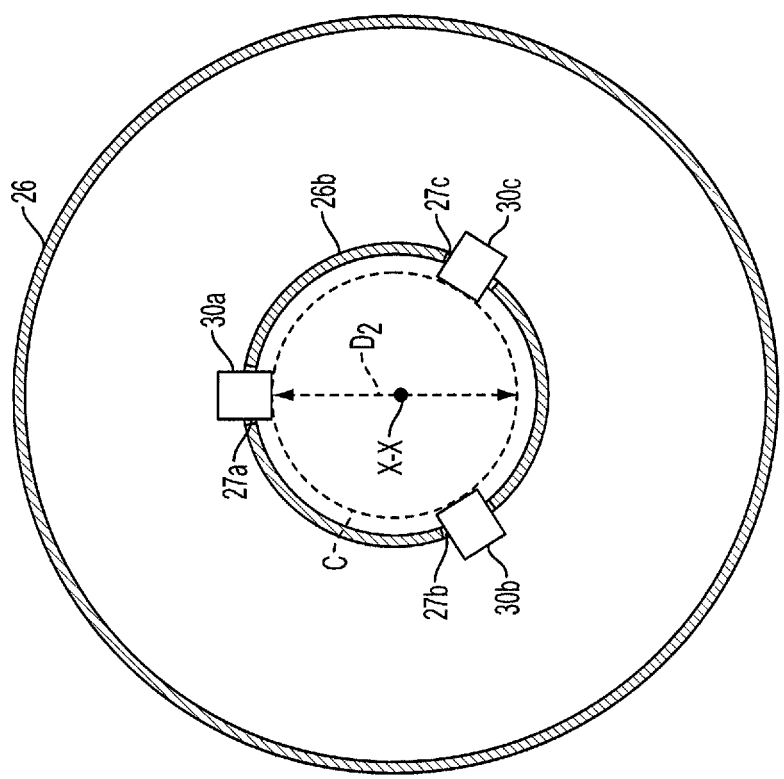
FIG. 5C is a cross-sectional view of the drogue as taken generally along the line 5C-5C in FIG. 5A.
Figure 6:
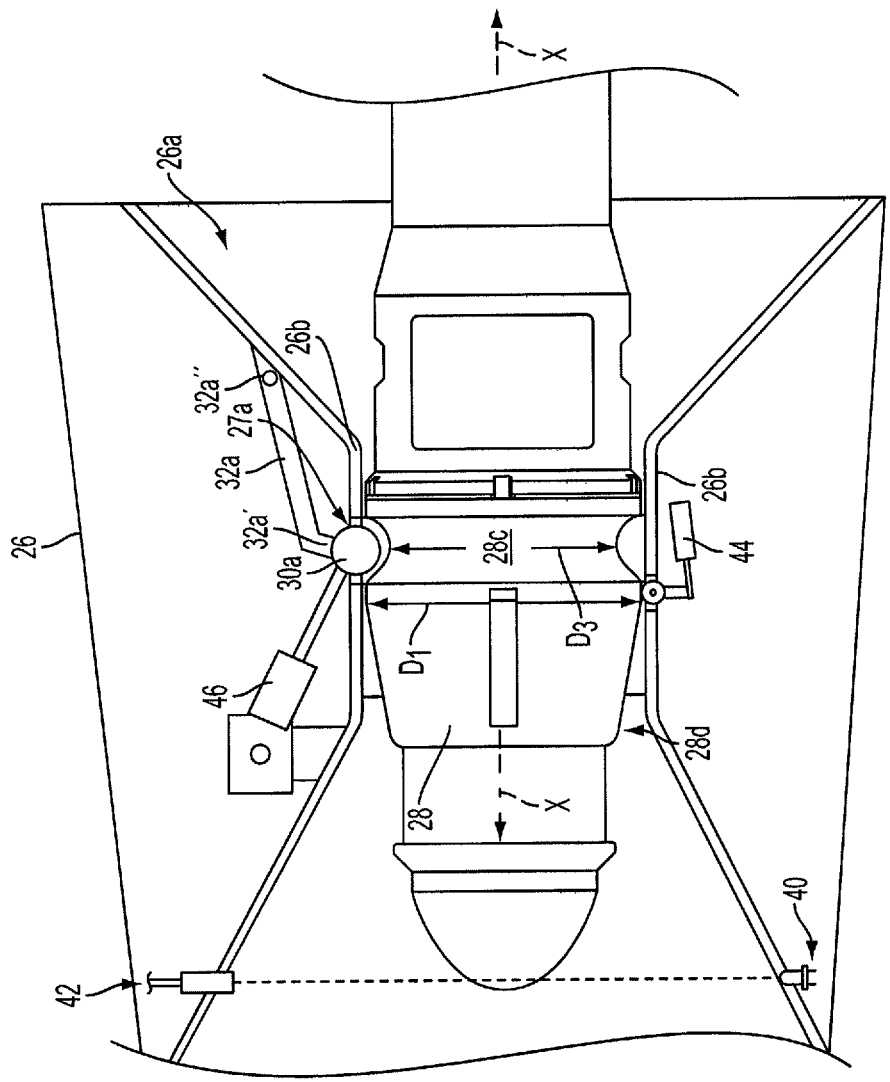
FIG. 6 is a view similar to FIG. 5B showing another embodiment of the invention.

In order to releasably couple the drogue 26 and probe 28 together during refueling, the roller elements 30a-c are each carried on another element which causes the rollers to be biased radially inwardly through a respective opening 27a-c in neck segment 26b toward the longitudinal axis X-X of drogue 26 (FIG. 5C). In the embodiments of FIGS. 5A and B, one or more rollers 30a-c are carried on a respective pivoting connecting arm 32a-c (only roller 30a and arm 31a shown). In the preferred embodiment, the rollers 30a-c are normally biased radially inwardly (e.g., by a piston and connecting rod assembly 39 seen in FIG. 6) and deflect radially outwardly against the bias by the force of the probe outer surface segment 28d which is located distally of ring segment 28c (toward probe end 28a). As seen, probe outer surface segment 28d tapers outwardly in the proximal direction to a maximum diameter $D_1$ (FIG. 5B) that is greater than the diameter $D_2$ of the imaginary circle "C" defined by the normally inwardly biased roller elements 30a-c (FIG. 5C).

As such, as the probe 28 enters drogue 26, probe surface segment 28d encounters and passes over roller elements 30a-c with the gradually increasing diameter of surface segment 28d applying a radially outwardly directed force against, and thereby deflecting, roller elements 30a-c in the same outward direction. Narrowed ring segment 28c has a minimum diameter $D_3$ which is about the same as or less than diameter $D_2$. As such, once surface segment 28d has passed the roller elements 30a-c, the rollers are forced under bias radially inwardly and become located adjacent ring segment 28c as seen in FIGS. 5B and 6. This is the fully coupled position of drogue 26 and probe 28. Uncoupling of the drogue and probe is accomplished by a retraction force of probe 28 in the opposite direction away from drogue 26. The retraction force must of course be strong enough to overcome the bias of the roller elements 30a-c and this bias is therefore calculated and set to avoid unintentional decoupling due to the usual transient forces (e.g., cross winds) that may occur during the refueling process as is well known to those skilled in the art.

As discussed above, the present invention utilizes the full drogue-probe coupling event as a control parameter in the hose control methodology of the aerial refueling system. Since coupling is achieved upon rollers 30a-c locating within narrowed ring segment 28c as described above, one or more trigger devices may be positioned at or adjacent the roller/ring segment interface such that the trigger devices are trigged once the rollers 30a-c have located within the ring segment 28c.

In one embodiment, the one or more trigger devices may be in the form of a sensor that is "tripped" by the presence of the probe 28 in the fully coupled position with drogue 26. As used herein, the word "tripped" is meant to indicate any detectable change in condition including, for example, an "on" to "off" condition or vice versa. In an embodiment, there may be one or more signal emitting devices on the drogue 26. For instance, as seen in FIGS. 5A and 5B, a proximity sensor such as a light source (e.g., LED) 40 and a light detector 42 may be positioned opposite each other within drogue 26 distally of roller elements 30a-c. Dashed line $L_1$ in FIG. 5A depicts an uninterrupted light beam between source 40 and detector 42 which is indicative of a "not coupled" condition between drogue 26 and probe 28. FIG. 5B illustrates a full coupling event between drogue 26 and probe 28 wherein light line $L_1$ is no longer present, having been interrupted by the presence of probe 28. Detector 42, which is no longer receiving a light signal from light source 40, emits a signal which is received by one or more signal receiving devices on the leading aircraft 10. In some embodiments, the signal emitting devices may be modulated at a predetermined frequency. In an embodiment, the signal emitting devices may be one of LEDs, infrared diodes, lasers, or radio or microwave emitters. Of course, it should be noted that the signal emitting devices may be any other type of devices capable of emitting signals that are known in the art.

The signals emitted by the signal emitting devices may be received by signal receiving devices positioned on the leading aircraft 10. The signal receiving device, in turn, controls the actuator which, in turn, controls the hose reel which thereby takes up slack in the hose upon the drogue/probe coupling event, as more fully explained below. Similar to the emitting devices above, the signal emitting devices, in some embodiments, may be modulated at a predetermined frequency.

It is noted that it is desirable to ensure that the sensor is not tripped by an incomplete coupling event which may occur when the probe 28 enters, but does not fully connect to the drogue 26. This may be accomplished in a variety of different ways. For example, the position of the sensor within drogue 26 could be set such that it is tripped only upon a full coupling event. Referring to the embodiment of FIGS. 5A and 5B, light source 40 and light detector 42 may be positioned a distance from roller elements 30a-c which is about the same as or slightly shorter than the distance from probe tip 28a to ring segment 28c. As such, the light beam $L_1$ will not be interrupted until the probe has fully coupled with the drogue. Alternatively or in combination with this method, the sensor may be connected to a timer which prevents a signal being sent until a predetermined time period has passed (e.g., 50 milliseconds). This would prevent a coupling event signal being sent when the probe enters but fails to completely couple with the drogue and withdraws quickly due to unexpected turbulence, for example.

In another embodiment, the one or more trigger devices may be directly connected to a respective roller element 30a-c such that the trigger device is triggered in response to the movement of the roller element connecting arm which occurs when the probe enters the drogue, as described above. As seen in FIG. 6, roller elements 30a-c are each attached (only 30a shown) to the free end 32a' of a respective arm 32a, the opposite end of which is pivotally connected at pivot point 32a" to the drogue 26. One or more switches 44, 46 may be positioned such that they are closed upon entry of the probe 28 into drogue 26. Any type of suitable switch may be used, for example, a contact switch 44 positioned to be tripped by a coupled probe 28, or a mechanical switch 46 which is closed by movement of connecting arm 32a caused by a coupled probe 28. Again, the optimal positions of the switches will be determined according to design preference but are desirably positioned so as to not be accidentally tripped by a "no couple" event.

A variety of different types of signal sending and signal receiving devices may be used to indicate a coupling event between the drogue and probe. For ease of identification, all types of signal sending devices in the Figures are represented generally by the reference numeral 100 and all types of signal receiving devices are represented generally by the reference numeral 200. Besides these general reference numbers 100 and 200, specific embodiments of the signal sending and receiving devices are also represented by unique reference numerals as set forth below.

In a first embodiment, the signal sending means may be in the form of optical elements (e.g. including but not limited to lasers, LEDs (light emitting diodes), strobe lights, etc.) that may be perceived by a receiving device when the one or more optical elements are activated by a coupling event trigger. For example, as seen in FIGS. 3A and 3D and 4A and 4B, one or more LEDs 52 may be positioned in any desired strategic location such as the drogue rearward facing surface 26b. The signal receiving element may be in the form of an optical sensor 54 located in a desired strategic signal-pickup location such as the aircraft or fuel pod 14, for example (FIG. 4A). More than one optical sensor may be provided as indicated at 56 to provide redundancy should the main sensor 54 malfunction or fail to see the coupling signal due to lack of line-of-sight and/or physical or atmospheric interference between the signal sending device and the main signal receiving device.

In another embodiment, the signal sending device may be in the form of a radio signal 58 which may be received by a radio detector or receiver 60 as seen in FIG. 3C. The radio receiver 60 is connected to the hose reel motor controller 23 which is connected to the hose reel motor 22 and hose reel 18. The radio receiver 60 may be programmed to a predetermined frequency (see pulse 62 in FIG. 3C) which may be used to ensure the coupling event has taken place. For example, a failed coupling event may trigger a very short pulse which is considered a false positive signal. In this instance, the radio receiver or other signal receiver would not cause the hose reel controller 23 to activate to take up hose slack. By programming a specified parameter into the receiver, the receiver will only activate the hose reel controller when the parameter or predetermined threshold is reached which is indicative of a successful coupling event.

It is noted that although the signal sending means in FIG. 3C is depicted as switches 46 which are respectively coupled to the three roller elements 30*a-c* in the drogue, any signal sending device may be matched to any cooperative signal receiving device and it is therefore understood the invention is not limited to the specific signal sending/receiver combinations illustrated in the Figures. Likewise, the hose reel controller may also be of any desired type (e.g., hydraulic or electric controlled) and the invention is not limited to the specific embodiments shown and described herein.

In yet another "hard-wired" embodiment seen in FIG. 3B, the signal sending device 100 is connected to a conductor (wire) 68 which is connected to and travels the length of hose 16, ultimately connecting to the signal receiving element 200.

Upon the drogue/probe coupling event, the actuator 23 may act to control the hose reel motor 20 which, in turn, may act to cause the hose reel 18 to turn and take up slack in the hose 16. The ability of the actuator 23 to control the hose reel motor 20 and reel 18 and take up slack in the hose 16 may occur through a variety of mechanisms. In one embodiment, the signal receiving device 200, when triggered, may act to switch the signal emitting device 100 to an "on or off" position, which, in turn, may act to emit a signal which is received by the receiving device 200 on the leading aircraft 10. Once this signal is received by the receiving device 200 on the leading aircraft 10, the actuator 23 may be activated to take up slack in the hose 16 while the drogue 26 and the probe 28 are engaged with one another. For example, in the embodiment of FIG. 3A, the signal sending device comprising LEDs 52 communicate with the signal receiving device comprising infrared camera 50, on the leading aircraft 10 which, in turn, causes the actuator 23 to activate hose reel motor 20 take up slack in the hose 16.

In a further embodiment, one or more motion displacement measuring devices may be situated on the hose 16. The one or more motion displacement measuring devices are designed to allow the difference between the detected drogue 26 position relative to the trailing aircraft 12 (e.g., by a device that optically measures the distance of the drogue from a predetermined location on the leading aircraft) and the detected displacement of the hose 16 (e.g., by a device measuring length markings on the hose or a device detecting the number of unwinding turns of the hose reel or an encoder located on the reel drive system) to be measured. The resulting measurements may be compared using appropriate electronics to determine the amount of slack in the hose 16 (slack is present when the measured location of the drogue relative to the leading aircraft is shorter than the length of hose unwound from the reel), which may, in turn, act to send a signal to and cause the actuator to take up the measured slack in the hose 16 so as to reduce or eliminate the potential for whipping of the hose 16 and resulting damage to systems or aircraft. The measured amount of slack in the hose 16 may also be used to trigger a fault indication signal to the aircraft control system of one or both of the leading aircraft 10 and the trailing aircraft 12. The fault indication signal may serve to trigger the actuator to take up slack in the hose 16.

Taking up slack in the hose 16, or retracting the hose 16, may occur through the application of additional retraction force applied to the hose reel 18. The amount of additional force applied may range from about 100 lbs to about 300 lbs. In one embodiment, the difference between the amount of retraction force added and the original setting may be about 100 lbs. Since the pull out force of the probe 28 is generally between 300-400 lbs depending on the coupling, applying an additional 100 lbs of force to the original setting of about 100 lbs should not result in the separation of the probe 28 from the drogue 26. This additional force may be maintained until the hose 16 ceases to move in any further (i.e., where the probe 28 has coupled and the trailing aircraft 12 is holding the additional 100 lbs of force) or until the hose 16 has retracted a predetermined additional length, e.g., about 10 ft. In the event that the hose 16 retracts 10 ft without stopping, the system may return the retraction force to the original setting and/or reduce the retraction force until the hose 16 stops moving in. This may occur in a situation in which the probe 28 may engage the coupling enough to depress the rollers or otherwise signal a coupling event, but does not fully engage and instead pulls back from the drogue 26. By returning the retraction force to the original setting, the hose 16 may be stopped from pulling in further and may be let out to full trail so as to prepare the hose 16 for another attempt at coupling.

Figure 7A:
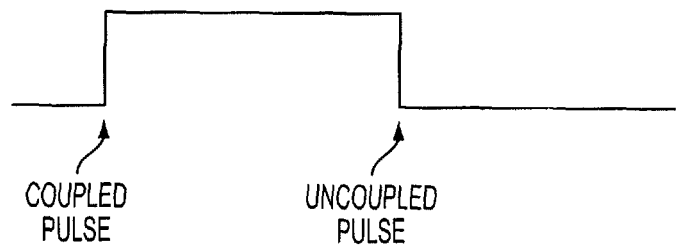
FIGS. 7A-C are schematic representations of drogue-probe coupling event and concomitant signal and hose reel actuator responses.
Figure 7B:
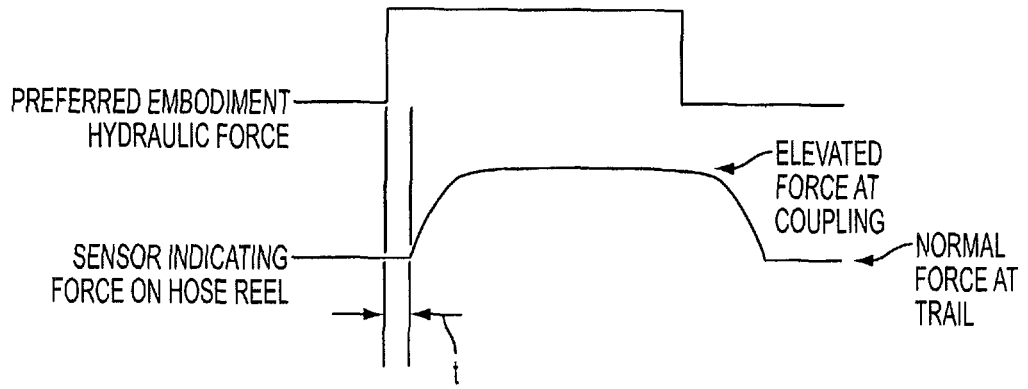
Figure 7C:
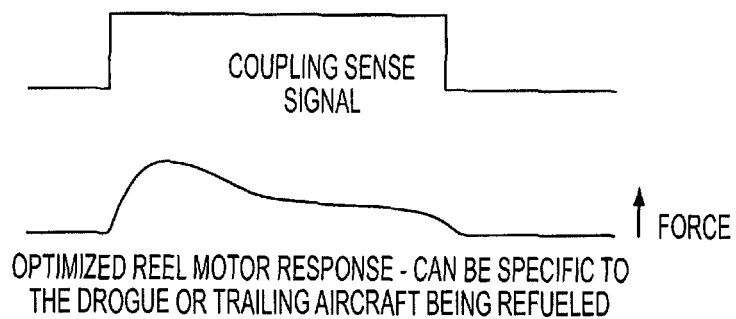
Figure 8A:
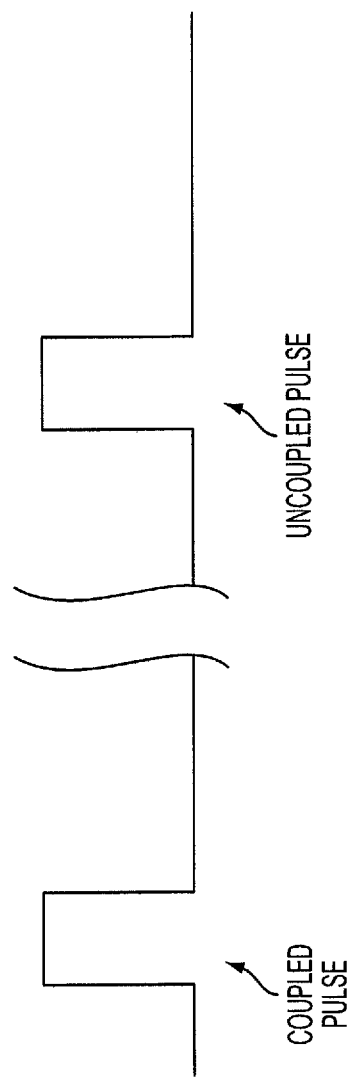
FIGS. 8A-B are schematic representations of drogue-probe uncoupling event and concomitant signal and hose reel actuator responses.
Figure 8B:
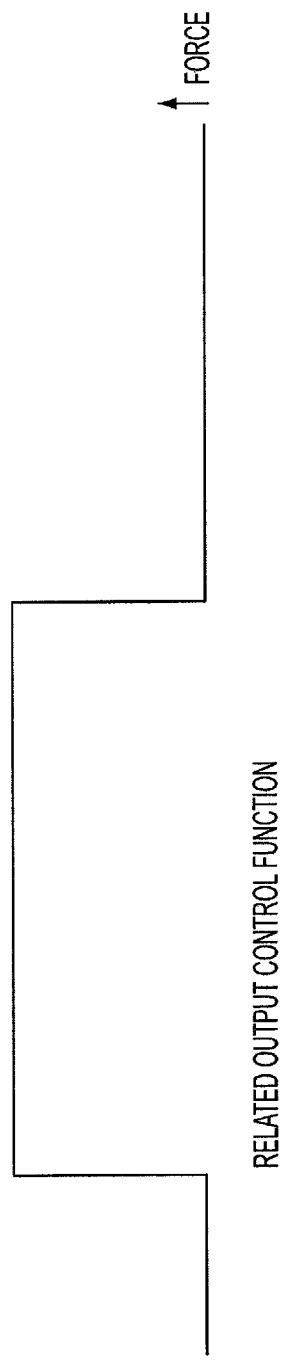

If desired, the trigger devices described herein may work in the reverse to signal a decoupling event which occurs when the probe 28 detaches from the drogue 26. This may be intentional, as when the fueling operation is completed, or unintentional due to such things as mechanical failure, unintentional pull away of the leading aircraft 10 and trailing aircraft 12, and excessive wind forces, for example. Appropriate system responses (e.g., reel rewind of the hose) may be designed into the system. FIGS. 7A-7C and FIGS. 8A and 8B schematically illustrate the coupling and uncoupling signals with the corresponding actuator response on the hose reel. FIG. 7B illustrates an optional delayed time "t" for actuator response which helps ensure there is a positive coupling event prior to the actuator signaling a hose reel response. FIG. 7C illustrates that the hose reel response may be programmed and varied depending on the aircraft and refueling equipment being utilized. FIG. 8A illustrates a connection pulse and the related output actuator control function for hose response in FIG. 8B. Upon receiving a drogue disconnect pulse as seen in FIG. 8A, the output control function at the hose reel ceases as seen in FIG. 8B.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. Apparatus for an in-flight refueling system between a first aircraft and a second aircraft, the first aircraft providing fuel to the second aircraft through a hose having a first end mounted on the first aircraft and a second free end connected to a drogue having inner and outer surfaces, said second aircraft fitted with a probe which may be brought into removable engagement with the drogue while said first and second aircraft are both in flight, said apparatus comprising:
  a) an actuator on said first aircraft to which said hose first end is connected, said actuator operable to control the extension and retraction of said hose;
  b) one or more trigger devices positioned at a predetermined location on said drogue;
  c) one or more signal emitting devices on said drogue, said one or more signal emitting devices switchable between off and on positions to thereby produce a signal when said one or more trigger devices is triggered; and
  d) one or more signal receiving devices positioned on said first aircraft and configured to receive said signal and operable to control said actuator to take up slack in said hose while said drogue and said probe are coupled with one another,
  wherein said probe has a probe tip and said trigger devices are triggered only upon said probe tip reaching said predetermined location in said drogue and thereby signaling full coupling of said probe and drogue.

2. The apparatus of claim 1, wherein said actuator is a hydraulic motor.

3. The apparatus of claim 1, wherein said actuator is an electric motor.

4. The apparatus of claim 1, wherein said one or more signal emitting devices are one of LEDs, infrared diodes, radio or microwave emitters.

5. The apparatus of claim 1, wherein said one or more signal emitting devices and said one or more signal receiving devices are modulated at a predetermined frequency.

6. The apparatus of claim 1, wherein said one or more trigger devices comprise a light source and detector pair having a line-of-sight that is interrupted by said probe tip reaching said predetermined location in said drogue.

7. The apparatus of claim 1, wherein said one or more trigger devices comprise a mechanical switch which is triggered upon engagement of said probe with said drogue.

8. The apparatus of claim 1, wherein said signal emitting devices emits said signal only after said trigger device has been triggered for a threshold length of time.

9. The apparatus of claim 8, wherein said threshold length of time is about 50 milliseconds.

10. Apparatus for an in-flight refueling system between a first aircraft and a second aircraft, the first aircraft providing fuel to the second aircraft through a fuel line having a first end mounted on a hose reel on the first aircraft and a second free end connected to a drogue, said second aircraft fitted with a probe which may be brought into removable engagement with the drogue while said first and second aircraft are both in flight, said apparatus comprising:
  a) one or more switches changeable between open and closed conditions positioned at a predetermined location on said drogue, said probe configured to change said one or more switches from one of said open and closed conditions to the other of said open and closed conditions upon said probe being fully coupled with said drogue;
  b) one or more signal emitting devices on said drogue and configured to emit a signal when said one or more switches are changed from said one of said open and closed conditions to the other of said open and closed conditions; and
  c) one or more signal receiving devices positioned on said first aircraft and configured to receive said signal indicating full coupling between said probe and drogue wherein said one or more signal receiving devices is operable to control one or more predetermined functions on said first aircraft upon receiving said signal;
  said system further comprising a second signal emitting device comprising a light source and detector pair located within said drogue and having a line-of-sight that is interrupted upon said full coupling of said probe with said drogue and, upon said interruption, is operable to emit a second signal which is operable to control one or more predetermined functions on said first aircraft, and
  wherein said one or more predetermined functions is performed upon said one or more signal receiving devices receiving said first and second signals, and
  wherein said fuel line is a hose attached to said hose reel on said first aircraft and said predetermined function is said hose reel taking UP of slack in said hose.

11. Apparatus of claim 10 wherein said predetermined function is initiation of fuel delivery through said fuel line.

12. Apparatus according to claim 10 wherein said drogue includes one or more roller elements biased radially inwardly toward the longitudinal axis of said drogue and said one or more switches are connected to said one or more roller elements whereby movement of said one or more roller elements radially outwardly a predetermined distance causes said one or more switches to change from one of said open and closed conditions to the other of said open and closed conditions, said probe configured to move said roller elements radially outwardly said predetermined distance upon full coupling of said probe with said drogue.

13. Apparatus according to claim 10 wherein said probe includes a probe tip configured to interrupt said line-of-sight upon full coupling of said probe with said drogue.

14. Apparatus according to claim 13 wherein said drogue includes one or more roller elements biased radially inwardly toward the longitudinal axis of said drogue and said one or more switches are connected to said one or more roller elements whereby movement of said one or more roller elements radially outwardly a predetermined distance causes said one or more switches to change from one of said open and closed conditions to the other of said open and closed conditions, said probe configured to move said roller elements radially outwardly said predetermined distance upon full coupling of said probe with said drogue.

15. Apparatus according to claim 14 wherein said probe includes a narrowed ring element located proximally of said probe tip, and wherein said roller elements bias inwardly and locate within said narrowed ring segment only upon full advancement and coupling of said probe within said drogue, and wherein said probe tip is spaced from said narrowed ring segment a distance which causes said probe tip to interrupt said line-of-sight only when said roller elements have located within said narrowed ring segment.

* * * * *